Aug. 27, 1963 J. F. PRIBONIC 3,101,739
PRESSURE RELIEF VALVE
Filed Sept. 26, 1960
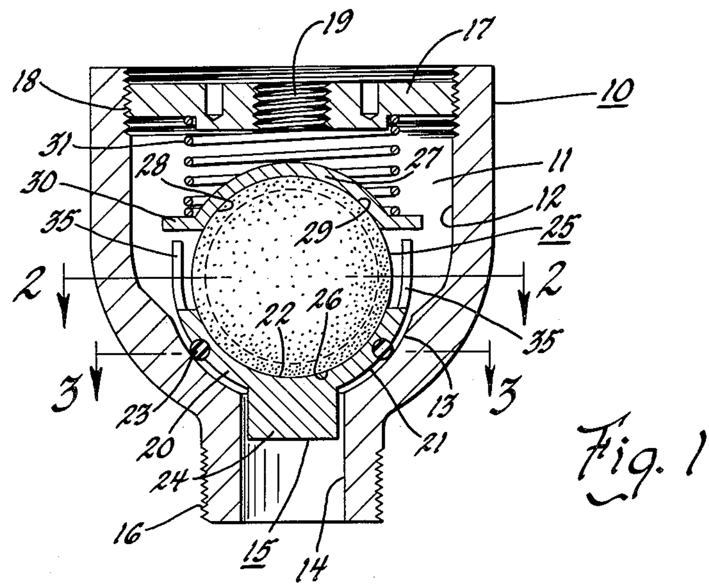
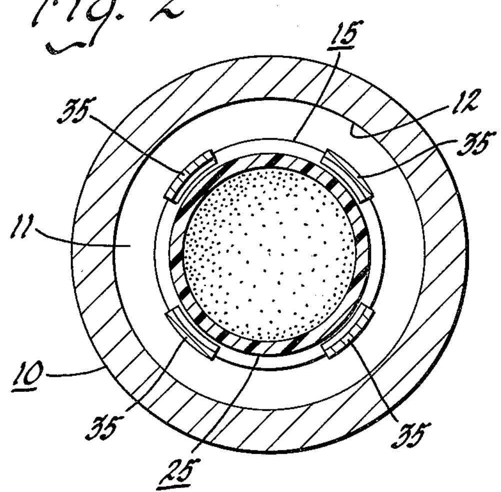
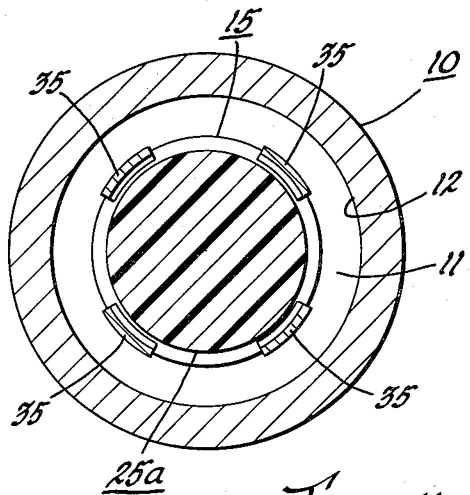
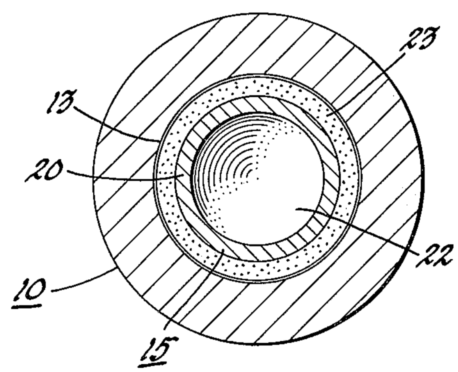
INVENTOR.
John F. Pribonic
BY
D. C. Staley
HIS ATTORNEY United States Patent Office 3,101,739

Patented Aug. 27, 1963

3,101,739

PRESSURE RELIEF VALVE

John F. Pribonic, Dayton, Ohio, assignor to General Motors Corporation, Detroit, Mich., a corporation of Delaware Filed Sept. 26, 1960, Ser. No. 58,302
12 Claims. (Cl. 137—529)

The present invention relates to a fluid-pressure relief valve adapted to seal against a pressure in a conduit or chamber and adapted to open to relieve pressure from the conduit or chamber when the pressure exceeds a predetermined value at which the pressure relief valve is set.

One of the problems in pressure relief valves is that of obtaining a uniformly distributed pressure or force applied to the valve element of the relief valve to effect engagement of the valve element with its seat in a manner that the seating pressure is uniformly distributed over the seat area between the valve element and the valve seat.

It is therefore an object of this invention to provide a fluid-pressure relief valve that is constructed and arranged in a manner that the valve element of the relief valve will have seating pressure applied to the valve element uniformly over the seat area of the valve element to obtain a more uniform engagement of the valve element with the valve seat and thereby provide for a more accurate relief pressure setting of the relief valve. Since the maximum pressure retained in a chamber by a relief valve is determined by the minimum engagement pressure between the relief valve element and the seat for the same, it will be appreciated that if the seating force on the valve element is distributed uniformly over the seat area for the valve element that the relief setting for the relief valve can be more accurately controlled.

To accomplish the foregoing object, it is another object of the invention to provide a deformable nonrigid body that may be in the form of a sphere of resilient deformable material having elastic recovery, such as rubber or rubber-like materials, between the valve element for the relief valve and the resilient force applying means that retains the valve element on its seat so that the deformable body can transfer force applying pressure, or spring pressure, from the force applying means to the valve element, and deform sufficiently to distribute uniformly the force applying pressure to the valve element and thereby to the valve seat engaged by the valve element.

In accomplishing the foregoing object, it is another object of the invention to provide the valve element of the relief valve with a generally spherical concave surface that is engaged by a deformable nonrigid body that is in the general form of a sphere of resilient deformable material having elastic recovery that generally conforms to the contour of the valve element so that a resilient force, such as a spring force, applied to the deformable body will be distributed uniformly from the deformable body to the valve element and thereby to the seat element that is engaged by the valve element for uniform seating engagement of the valve element on its annular seat element.

Further objects and advantages will be apparent from the drawings and the following description.

In the drawings:

FIGURE 1 is a transverse cross section of a relief valve incorporating features of this invention.

FIGURE 2 is a cross section taken along line 2—2 of FIGURE 1.

FIGURE 3 is a cross section taken along line 3—3 of FIGURE 1.

FIGURE 4 is a cross section similar to that of FIGURE 2 and taken along substantially the same line but showing a modified form of the invention.

In this invention the pressure relief valve consists of a body 10 forming a valve receiving chamber 11 that has a wall surface 12 provided with a wall portion 13 that is formed arcuately and concavely generally in the form of a semisphere. The body 10 is also provided with a port 14 through which fluid exhausts against the valve element 15 when pressure exceeds a predetermined value in the chamber or conduit with which the port 14 communicates. The port 14 is arranged at the axis of the semispherical concavity 13 so that the chamber wall surface 13 extends from the juncture with the port 14 and outwardly therefrom in a generally semispherical concave configuration. The body 10 has the threaded portion 16 to attach the body to a suitable conduit or chamber, and has a closure wall 17 threadedly received in the upper end of the chamber 11 by the thread engagement 18, and has an opening 19 through which fluid can escape from the chamber 11 when the valve element 15 opens.

The valve element 15 has a body portion 20 that is generally in the form of a semispherical element having an external convexly arranged semispherical surface 21 and an internal concavely arranged semispherical surface 22 that is spaced from the surface 21. Both surfaces 21 and 22 generally conform to the contour of the concavely arranged semispherical surface 13 of the chamber wall 12. An O-ring of rubber-like resilient material 23 is carried on the valve element 15 and is therefore positioned between the valve element 15 and the concave surface of the chamber wall 12, which surface 13 forms the valve seat for the O-ring 23 when the valve element is in the engaged position shown in FIGURE 1. The O-ring 23 is in the form of an annulus, as shown in FIGURE 3.

The valve element 15 has an extension or projection 24 that extends into the port opening 14 to limit the angular deflection of the valve element about the axis or radius of the surface 13, and also provides a guide member for the valve element when it is lifted from the seat surface 13.

The valve element 15, and specifically the concave semispherical surface 22 thereof, supports a deformable nonrigid body that is made of a resilient deformable material having elastic recovery, such as rubber or rubber-like materials. This deformable body 25 has a surface 26 that is arcuately convexly shaped in the form of a semisphere and conforms to the concavely arranged semispherical surface 22 of the valve element 15. Thus the deformable body 25 intimately engages the surface 22 of the valve element.

The deformable body 25 is engaged by a spring retainer member 27 that has an inner surface 28 arranged in the form of a concave arcuate surface generally semispherical in contour that engages a similarly contoured surface 29 on the body 25. This semispherically shaped spring retainer member 27 has the flange portion 30 engaged by a compression spring 31 that is positioned between the flange 30 and the closure member 17 thereby to apply the resilient force to the deformable body 25 and retain it in engagement with the surface 22 on the valve element 15.

The deformable nonrigid body 25 may be in the form of a hollow spherical element filled with a liquid or a gas, such fluids allowing the hollow nonrigid body to deform when pressure is applied to the body by the spring 31 and confining it between the spring retainer member 27 and the valve element 15. On the other hand, the deformable body 25 may be a solid element 25*a*, such as illustrated in FIGURE 4, wherein the mass of the body comprises a resilient deformable material that has elastic recovery, such as rubber or rubber-like materials.

The valve element 15 has a plurality of stop members 35 positioned equidistantly around the periphery of the body member 25 to limit the degree of angular displacement between the valve element 15 and the spring retainer 27 and thereby tend to hold the entire assembly coaxial with the axis of the chamber 12, on which axis the port 14 is also located.

From the foregoing description it will be apparent that when force is applied to the deformable body 25 by the spring retainer 27, the applied forces will radiate from the center of the spherical member 25 uniformly in all directions so that the same unit of force is applied to each unit of surface area of the concave semispherical surface 22 on the valve element 15. This equal distribution of unit force to all areas of the concave surface 22 will, in turn, apply force uniformly to the annulus 23 that forms the O-ring seal element between the valve element 15 and the seat surface 13 on the valve body 10. With the applying force being uniformly distributed around the valve element 22 on the O-ring 23, it will be apparent that all surface engagement of the O-ring 23 with the seat surface 13 will be with an equivalent engaging force. Thus, with the O-ring annularly engaging the seat surface 13 uniformly throughout the annulus portion thereof the spring setting for holding the valve element 15 on its seat can be more accurately controlled. Also, since all of the coacting surfaces between the body 25 and the spring retainer 27 as well as the valve element 15 and the O-ring 23 with the seat surface 13 are all semispherical in general contour, the valve assembly will be self-centering and self-aligning on the axis of the chamber 11 about the radius center for the several semispherical coacting surfaces.

While the embodiment of the present invention as herein disclosed constitutes a preferred form, it is to be understood that other forms might be adopted.

What is claimed is as follows:

1. A valve, comprising, a body member having a wall surface forming a valve receiving chamber therein and having a fluid flow port extending from the chamber, said chamber having said chamber wall surface adjacent the juncture thereof with the said port formed arcuately and concavely with said port at the axis of the concavity of the said chamber wall surface, a valve member having a first convexly formed wall surface portion conforming with said arcuate concavity of said chamber wall surface disposed in coaxial juxtaposition thereto, an annulus of resilient material positioned between said valve member and said chamber wall surface and seating on each to prevent fluid flow through said port, said valve member having a second wall surface portion spaced from said first wall surface portion and formed with an arcuate concavity therein coaxial with said convexly formed first wall surface portion, a resilient self-supporting body positioned in said concavity in said second wall surface portion, and yieldable means for applying uniformly a force against said self-supporting body for causing said body to bear resiliently against said valve member and to distribute uniformly the sealing pressure applied against said annulus by said valve member.

2. A valve constructed and arranged in accordance with claim 1 wherein said concavely formed surfaces and said convexly formed surfaces are generally semispherical in contour.

3. A valve, comprising, a body member having a wall surface forming a valve receiving chamber therein and having a fluid flow port extending from the chamber, said chamber having said chamber wall surface adjacent the juncture thereof with the said port formed arcuately and concavely with said port at the axis of the concavity of the said chamber wall surface, a valve member having a first convexly formed wall surface portion conforming with said arcuate concavity of said chamber wall surface disposed in coaxial juxtaposition thereto, an annulus of resilient material positioned between said valve member and said chamber wall surface and seating on each to prevent fluid flow through said port, said valve member having a second wall surface portion spaced from said first wall surface portion and formed with an arcuate concavity therein coaxial with said convexly formed first wall surface portion, a resilient self supporting body positioned in said concavity of said second wall surface portion and having a wall surface thereon conforming to said concavity of said second wall surface portion on said valve member for distribution thereby of forces uniformly to the valve member, a resilient self-supporting body positioned in said concavity in said second wall surface portion, and yieldable means for applying uniformly a force against said self-supporting body for causing said body to bear resiliently against said valve member and to distribute uniformly the sealing pressure applied against said annulus by said valve member.

4. A valve constructed and arranged in accordance with claim 3 wherein all of the concavely formed surfaces and convexly formed surfaces are generally semispherical in contour.

5. A valve constructed and arranged in accordance with claim 3 wherein at least a portion of said valve member is engageable with at least a portion of said spring retainer for limiting deformation of said resilient body.

6. A valve, comprising, a body member having a semispherical wall surface forming a valve receiving chamber therein and having a fluid flow port extending from the chamber, said chamber having said chamber wall surface adjacent the juncture thereof with the said port at the axis of the concavity, a valve member having a first convexly formed generally semispherical wall surface conforming with said semispherical concavity of said chamber wall surface disposed in coaxial juxtaposition thereto, an O ring of resilient material positioned between said valve member and said chamber wall surface and seating on each to prevent fluid flow through said port, said valve member having a second wall surface portion spaced from said first wall surface portion and formed with a generally semispherical concavity therein coaxial with said convexly formed first wall surface portion, a generally spherical resilient self supporting body member positioned in said concavity of said second wall surface portion of said valve member and conforming thereto, a spring retainer member engaging said resilient body member on the side thereof opposite to engagement of said body with said valve member, said spring retainer member and said resilient body member having complementary generally semispherical concave and convex surfaces, and spring means engaging said spring retainer urging the same against said resilient body thereby to distribute uniformly forces against the valve member and thereby distribute uniformly sealing pressure to said O ring.

7. A valve constructed and arranged in accordance with claim 1 wherein said resilient body comprises a hollow member filled with a fluid.

8. A valve constructed and arranged in accordance with claim 6 wherein the resilient body is hollow and is filled with a fluid.

9. A valve constructed and arranged in accordance with claim 3 wherein said resilient body is hollow and is filled with a fluid.

10. A valve constructed and arranged in accordance with claim 3 wherein the resilient body comprises a sphere of resilient deformable material having elastic recovery.

11. A pressure relief valve comprising in combination; a body member and a fluid flow port extending from said body member having a generally hemispherical seat therein, a valve head having a generally complementary contour to said seat, a resilient annular sealing member carried by said valve head and engageable with the valve seat, a resilient spherical body carried in a hemispherical cavity in said valve head, a spherical spring retainer engaging said resilient body in opposed relation to said valve head cavity, and spring means acting between said retainer and a portion of said body member for compressing said resilient body whereby uniform pressures are transmitted to the annular sealing member for forcing it into coextensive sealing relation with said valve seat under all conditions.

12. The pressure relief valve claimed in claim 11 including means for limiting angular axial movement of said valve head and sealing member.

References Cited in the file of this patent

UNITED STATES PATENTS

| | | |
|---|---|---|
| 587,704 | Clayton | Aug. 10, 1897 |
| 1,604,529 | Meyrowitz | Oct. 26, 1926 |
| 1,939,128 | Meyer | Dec. 12, 1933 |
| 2,735,047 | Garner | Feb. 14, 1956 |
| 2,927,765 | Morris | Mar. 8, 1960 |
| 2,929,401 | Cowan | Mar. 22, 1960 |
| 2,959,188 | Kepner | Nov. 8, 1960 |

FOREIGN PATENTS

| | | |
|---|---|---|
| 278,080 | Great Britain | Sept. 30, 1927 |
| 521,728 | Great Britain | May 29, 1940 |